3,555,550
JETTISONABLE ABSORBING ANTENNA SHIELD
Andrew W. Walters, Riverside, Calif., assignor to the United States of America as represented by the Secretary of the Navy
Filed Feb. 24, 1959, Ser. No. 795,297
Int. Cl. H01q *17/00*
U.S. Cl. 343—18
2 Claims

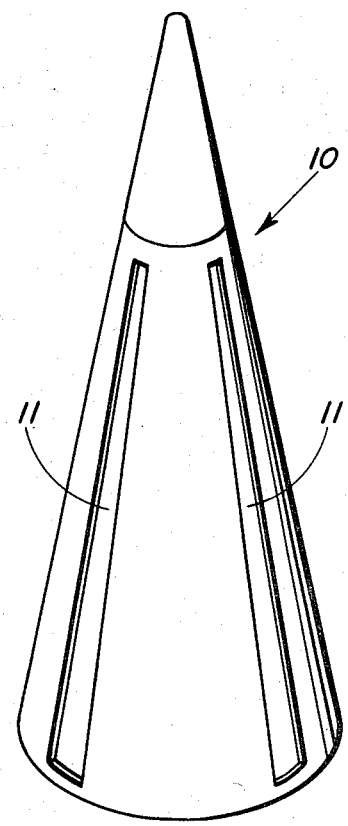
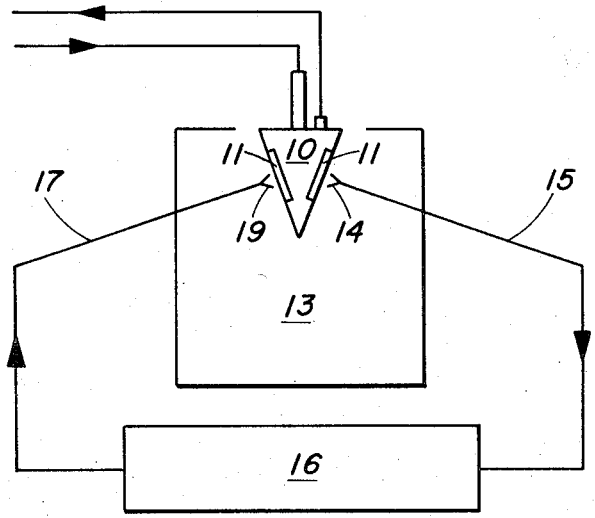

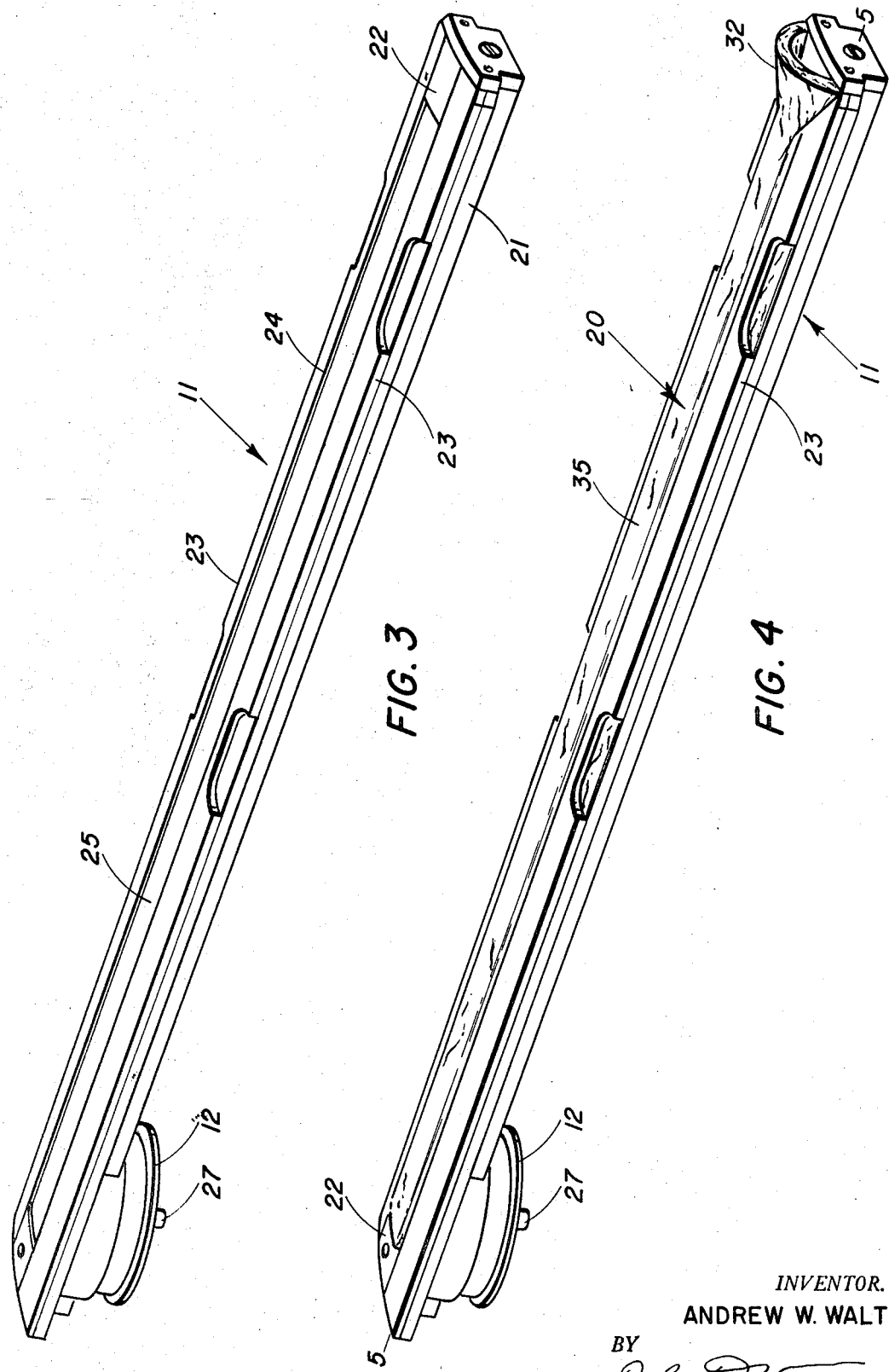

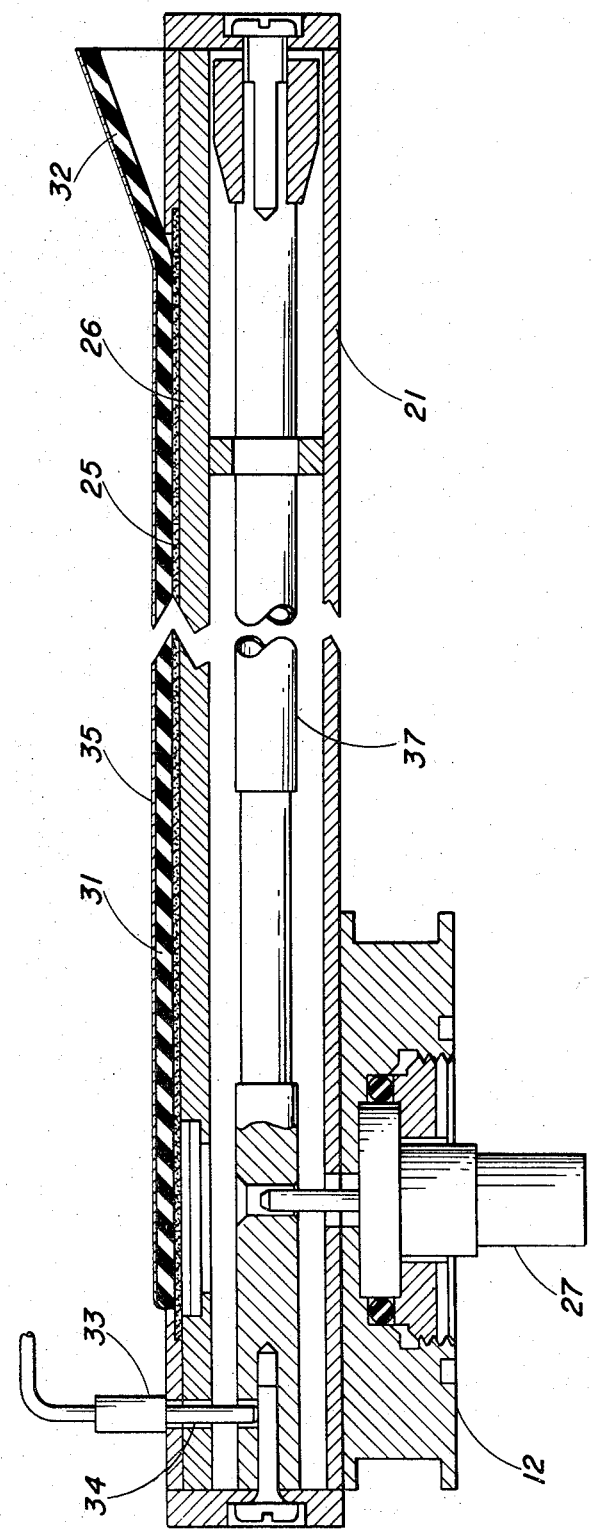

ABSTRACT OF THE DISCLOSURE

An electromagnetic wave shield is provided on a missile for shielding an antenna which receives a fuse detonation signal. This prevents accidental and premature detonation. The shield is stripped away by the force of the air when the missile reaches a predetermined velocity.

---

The invention described herein may be manufactured and used by or for the Government of the United States of America for Governmental purposes without the payment of any royalties thereon or therefor.

This invention relates to an antenna shield and more particularly to a means for shielding the transmitting and receiving antennas of a guided missile fuze system to permit checking of fuze sensitivity through the use of coaxial probes.

In prior methods of testing the fuze systems of missiles having a plurality of slot arrays spaced around the periphery of the missile nose cone, the nose cone normally had to be removed from the missile and inserted into a spacehood or the spacehood was placed over the nose cone during testing of the missile in the field or aboard ship. There were many disadvantages to this prior method including the inability of the spacehood to maintain sufficient isolation from fuze to fuze or from test to test and the inability to obtain consistent sensitivity checks because each fuze must be positioned exactly the same in the spacehood. Also the spacehoods are large and bulky and present a handling problem particularly aboard ship when the missiles are stored in ready rooms or in a launcher. Furthermore the spacehood must be removed from the missile prior to launching and during the period of training and directing the missile prior to launching thus exposing the fuze system to RF energy of friendly radar systems which causes crystal burnout in certain types of missile fuzes.

The present invention comprises a thin sheet of absorbing material secured to each antenna to permit jettisoning at the appropriate missile velocity. The absorbing material is backed by a thin conducting layer of metal and the detection of the output signal and the insertion of an input simulated target signal is accomplished through a small coaxial probe located at the input end of each antenna permitting testing of the fuze sensitivity under matched load conditions. The protective cover is maintained on the antenna until such time as the missile reaches an appropriate velocity after launching, keeping out powerful signals from friendly radar to prevent crystal burnout.

It is an object of the invention, therefore, to provide a light-weight shield for the antennas of a guided missile to permit quick and accurate checking of fuze sensitivity.

It is another object of the invention to provide an antenna shield for a missile fuze system whereby greater isolation between the transmitting and receiving antennas is maintained.

Another object of the invention is to provide a jettisonable shielding means for a missile fuze antenna.

A still further object of the invention is to provide a means of obtaining valid repeatable fuze sensitivity checks on a missile fuze system through the use of coaxial probes.

Other objects and many of the attendant advantages of this invention will be readily appreciated as the same becomes better understood by reference to the following detailed description when considered in connection with the accompanying drawings wherein:

FIG. 1 is a pictorial view of a typical missile nose cone;

FIG. 2 is a schematic diagram of a typical fuze sensitivity test set utilizing a spacehood;

FIG. 3 is a pictorial view of a missile antenna section dismounted from the nose cone;

FIG. 4 is a pictorial view of an antenna section with the present invention mounted thereon and;

FIG. 5 is a cross sectional view taken along line 5—5 of FIG. 4.

With particular reference to FIG. 1 of the drawings a missile nose cone 10 is shown having a plurality of equally spaced apart transmitting and receiving antennas 11 mounted longitudinally therein. The antennas 11 are coupled through a connector 12 (see FIG. 3) and other appropriate circuitry to the radio fuze system of the missile (not shown).

The nose cone section 10 housing the fuze and antennas is commonly known in the art as the Target Detecting Device (TDD) and in the past the RF sensitivity tests have been performed in the laboratory and in the field by the use of a conventional spacehood 13 as shown in FIG. 2. Each transmitting antenna 11 radiates into the cavity of the spacehood 13 which is lined with any suitable microwave absorbing material resulting in a simulated free space fuze operation.

The typical prior system for checking the fuze sensitivity with a spacehood 13 involved taking a sample of the output power from the transmitting antenna 11 by the use of the receiving horn 14 and feeding the transmitted signal through the cable 15 into the target simulator 16. The transmitted signal was suitably attenuated and phase modulated in the target simulator 16 and fed back into a receiving antenna 11 through the cable 17 and horn 19. It is important when making measurements in this type of system that the power leaking from the transmitting antenna to the receiving antenna be small compared to the power through the target simulator. In other words, the antennas must be electrically isolated to prevent pickup of stray unwanted signals and this requires that each nose cone 10 b epositioned exactly the same in the spacehood 13.

The present invention as shown in FIGS. 4 and 5 accomplishes this isolation requirement more effectively than the spacehoods as well as eliminating the handling problem presented in the use of the heavy spacehoods. The present invention consists of a jettisonable antenna shield 20 mounted on each of the transmitting and receiving antennas 11 of the nose cone 10.

Each antenna section 11 as shown in FIGS. 3, 4 and 5 comprises a rectangular waveguide well 21 having a cover plate 22 extending the full length thereof and including a mounting flange portion 23 extending on either side of the well 21. A slotted portion 24 is provided in the plate 22 and dielectric cover 25 is mounted therein to provide a cover for the slotted array antenna 26 mounted longitudinally in the waveguide well 21. The antenna array is connected to the fuze system by a lead 27 mounted coaxially in the connector 12 secured to the bottom of the well 21 housing at one end.

The shield 20 comprises a rubber strip 31 made of rubber absorbing material and mounted in the slot 24 against the top of the dielectric cover 25. The strip 31 is formed at its forward end to provide a cone-shaped portion 32 protruding above the top surface of the cover plate 22. The top of the strip 31 and the exposed surface of the cone-shaped portion 32 are completely covered with any suitable conducting metal cover 35 such as aluminum foil to prevent radiation from one of the transmitting antennas to a receiving antenna during a fuze sensitivity test and shielding-off friendly radar energy. The absorbing rubber strip 31 dissipates essentially all of the RF energy thus presenting a matched load for fuze systems being tested or in storage and preventing the transmission of a signal from the antenna until the strip is jettisoned in flight.

For detecting purposes to test the fuze a modified BNC or other suitable coaxial connector 33 is mounted on the plate 21 near the input end of the antenna and a center conductor 34 protrudes into the waveguide well 21 and is inserted in the coaxial feed 37.

The fuze with the present invention mounted on its antennas is tested by connecting the coaxial cable 15 of the test device shown in FIG. 2 to a center conductor 34 mounted on the transmitting antenna and connecting the cable 17 to a conductor 34 mounted on a receiving antenna to feed the fuze output through the target simulator 16 without the use of the spacehood 13 and horns 14, 19.

The strip 31 is secured to the cover 25 either by gluing the strip 31 on the cover 25 with an adhesive that would permit jettisoning of the shield 31 when the missile reaches an appropriate velocity or by extending the metal foil cover 35 under a slot (not shown) in the flanges 23.

The shield 20 is, therefore, mounted on the antenna when the fuze system is installed in the nose cone providing protection for the fuze system crystals during all phases of storage, testing and handling of the missile. Also test may be taken at any time merely by connecting the cables 15 and 17 to the appropriate conductors 34.

The shield 20 will be stripped from the antenna when the missile reaches the velocity after firing necessary to jettison the strip 31 and the metal cover 35 by the force of the air against the cone shaped portion 32. With the shield thus removed the missile will have normal fuze action through the antennas.

Obviously many modifications and variations of the present invention are possible in the light of the above teachings. It is therefore to be understood that within the scope of the appended claims the invention may be practiced otherwise than as specifically described.

What is claimed is:

1. A jettisonable antenna shield for a missile antenna comprising means for absorbing the energy output of said antenna and means covering said absorbing means for shielding said antenna from undesired RF signals, said absorbing means and cover means mounted on said antenna and forming the shield therefor having means thereon for being stripped from said antenna by the force of air against said means thereon when the missile reaches an appropriate velocity after launching.

2. A jettisonable antenna shield for antennae of a missile fuze system comprising a rubber absorbing strip mounted on each transmitting and receiving antenna and having a projection at its forward end and a metal foil shielding means covering all exposed surfaces of said strip, said strip and shielding means providing a shield for said fuze system prior to launching and said projection at the forward end of the rubber absorbing strip acting as a means for stripping and jettisoning said strip with said metal foil covering from the missile antenna by the force of air against said projection when the missile reaches a predetermined appropriate velocity after launching.

References Cited

UNITED STATES PATENTS

| | | | |
|---|---|---|---|
| 2,782,716 | 2/1957 | Johnston | 102—56 |
| 2,870,439 | 1/1959 | Slinehelfer | 343—18 |

OTHER REFERENCES

Electronics, v. 30, N11, Nov. 1, 1957, insert bewteen pages 48 and 49.

RICHARD A. FARLEY, Primary Examiner

B. L. RIBANDO, Assistant Examiner

U.S. Cl. X.R.

102—105